United States Patent [19]

Chirovsky et al.

[11] Patent Number: 4,914,286

[45] Date of Patent: Apr. 3, 1990

[54] METHOD AND APPARATUS FOR INCREASING THE PROCESSING CAPACITY OF OPTICAL DIGITAL PROCESSING SYSTEMS HAVING OPTICALLY BISTABLE DEVICES

[75] Inventors: Leo M. F. Chirovsky, Bridgewater, N.J.; Anthony L. Lentine, St. Charles, Ill.; David A. B. Miller, Fair Haven, N.J.

[73] Assignee: AT&T Bell Laboratories, Murray Hill, N.J.

[21] Appl. No.: 340,975

[22] Filed: Apr. 20, 1989

[51] Int. Cl.[4] .............................................. H01J 31/50
[52] U.S. Cl. ................................. 250/213 A; 377/102
[58] Field of Search ..................... 250/211 J, 213 A; 377/102

[56] References Cited

U.S. PATENT DOCUMENTS

| | | | |
|---|---|---|---|
| 4,546,244 | 10/1985 | Miller | 250/211 |
| 4,705,344 | 11/1987 | Hinton et al. | 350/3.73 |
| 4,749,850 | 6/1988 | Chemla et al. | 250/211 J |
| 4,751,378 | 6/1988 | Hinton et al. | 250/211 |
| 4,754,132 | 6/1988 | Hinton et al. | 250/211 |
| 4,764,890 | 8/1988 | Hinton | 364/807 |
| 4,782,222 | 11/1988 | Ragle et al. | 250/211 J |
| 4,800,262 | 1/1989 | Lentine | 250/213 A |

OTHER PUBLICATIONS

"The Quantum Well Self-Electrooptic Effect Device: Optoelectronic Bistability and Oscillation, and Self-Linearized Modulation," D. A. B. Miller et al., IEEE Journal of Quantum Electronics, vol. QE-21, No. 9, Sep. 1985, pp. 1462-1476.
"Integrated Quantum Well Self-Electro-Optic Effect Device: 2×2 Array of Optically Bistable Switches," D. A. B. Miller et al., Appl. Phys. Lett., vol. 49, No. 13, 29 Sep. 1986, pp. 821-823.
"Symmetric Self-Electro-Optic Effect Device: Optical Set-Reset Latch," A. L. Lentine et al., Appl. Phys. Lett., vol. 52, No. 17, 25 Apr. 1988, pp. 1419-1421.

*Primary Examiner*—David C. Nelms
*Assistant Examiner*—Khaled Shami
*Attorney, Agent, or Firm*—Scott W. McLellan

[57] ABSTRACT

An optically bistable device, such as a symmetric self electro-optic effect device (S-SEED), is forced into a metastable state prior to the incidence of an optical input signal thereto, thereby increasing the sensitivity of the optically bistable device to the optical input signal, reducing both the switching time and the optical input signal energy required to switch the device. The metastable state is entered into by one of three techniques: (1) turning off the bias voltage $V_0$ of the device with optical bias beams on then turning on the bias voltage $V_0$ with the optical bias beams off; (2) applying a predetermined voltage to a node in the device, the predetermined voltage being substantially the metastable state voltage or $V_0/2$; or (3) subjecting the device to equal intensity optical bias beams having a wavelength longer than the exciton wavelength. In the second case, optical bias beams and optical input signal beams may be applied simultaneously with the application of the predetermined voltage. In the last case, optical bias beams (at the exciton wavelength) and the optical input signal beams can be applied simultaneously after removal of the long-wavelength optical bias beams, thus saving switching time. In addition, the optically bistable device may be selectively placed in the metastable state and the optical input signal have sufficient energy to switch the device only when it is in the metastable state. This allows for multiple optically bistable devices to be selectively responsive to a common optical input signal, such as in a demultiplexer.

23 Claims, 2 Drawing Sheets

METHOD AND APPARATUS FOR INCREASING THE PROCESSING CAPACITY OF OPTICAL DIGITAL PROCESSING SYSTEMS HAVING OPTICALLY BISTABLE DEVICES

FIELD OF THE INVENTION

This invention relates to nonlinear optical elements in general and, more particularly, to those elements used in optically bistable devices, such as optical switches or the like.

BACKGROUND OF THE INVENTION

Optically bistable devices using the quantum confined Stark effect (QCSE), such as that shown in U.S. Pat. No. 4,754,132 by Hinton et al., having a common assignee with this invention, are useful in optical digital processing systems, such as optical digital computers and optical digital switching systems. The optically bistable devices are well suited to operate as logic gates or memory devices in these systems. However, optical bistable devices require a certain minimum optical energy input to switch from one optical state to another. Further, the time needed to switch states is usually inversely proportional to the optical signal input power available, provided the duration of the optical input signal is long enough to meet the minimum optical switching energy requirement. Therefore, the speed of the optically bistable device can be severely compromised if the magnitude of optical signal power applied is small. Since the amount of optical power available from practical laser sources is limited, the speed/optical input power tradeoff of optically bistable devices limits the number of these devices that can be placed in tandem to form complex logic networks, such as an adder used in an optical computer. Similarly, the size of large optical switching systems, using large numbers of optically bistable devices in parallel as part of the switching fabric, is limited. Therefore, the processing capacity of optical digital processing systems is limited by energy necessary to switch the optically bistable devices therein.

SUMMARY OF THE INVENTION

It is therefore desirable to increase the processing capacity of optical digital processing systems by adapting optically bistable devices used therein in a way to increase the sensitivity thereof to optical input signals without any substantial reduction in the switching speed thereof. It is also desirable to allow for the selective switching of optically bistable devices without any substantial reduction in the switching speed thereof.

This and other aspects are obtained generally by a method for increasing the processing capacity of an optical digital processing system, having at least one optically bistable device responsive to an optical input signal and having a metastable state between two stable states, characterized by the steps of: applying a stimulus to force the optically bistable device into the metastable state; applying the optical input signal; and, removing the stimulus.

Further, the above and other aspects are obtained generally by an optical digital processing system having at least one optically bistable device responsive to an optical input signal and having a metastable state between the two stable states, the optically bistable device having at least two photodetectors in series joined at a common node, characterized by: a voltage source having a predetermined voltage; and, a switch means for selectively coupling the voltage source to the common node; wherein the predetermined voltage, when coupled to the common mode, places the device in substantially the metastable state.

Still further, the above and other aspects are obtained generally by a method for selectively switching at least one optically bistable device in an optical digital processing system, the optically bistable device being responsive to an optical input signal and having a metastable state between two stable states, characterized by the steps of: selectively applying a stimulus to force the optically bistable device into the metastable state; applying the optical input signal to the device; and, removing the stimulus; wherein the energy supplied to the optically bistable device by the optical input signal is sufficient to switch the optically bistable device only if the stimulus is applied.

BRIEF DESCRIPTION OF THE DRAWING

The foregoing features of this invention, as well as the invention itself, may be more fully understood from the following detailed description of the drawings, in which.

DETAILED DESCRIPTION

Optically bistable devices can operate as logic gates or memory elements for optical digital processing systems such as optical digital switches or optical digital computers. Functionally, these optically bistable devices can correspond to conventional electrical equivalents, such as logical AND, NAND, OR, and NOR gates and flip-flops. One such optically bistable device is a symmetric self electro-optic effect device (S-SEED). The S-SEED can perform the above functions as cascadable, "dual rail" (differential), three terminal devices. Operating optically bistable devices in a manner that forces them into a metastable state prior to switching the device reduces the optical input signal power requirements and can allow for faster overall switching time.

To illustrate the advantages gained by switching optically bistable devices in the metastable state, in accordance with the present invention, an exemplary S-SEED device will be used to embody the invention. It is understood, however, that the invention can be applied to any optically bistable device which has an metastable state between two stable states.

Figure 1:
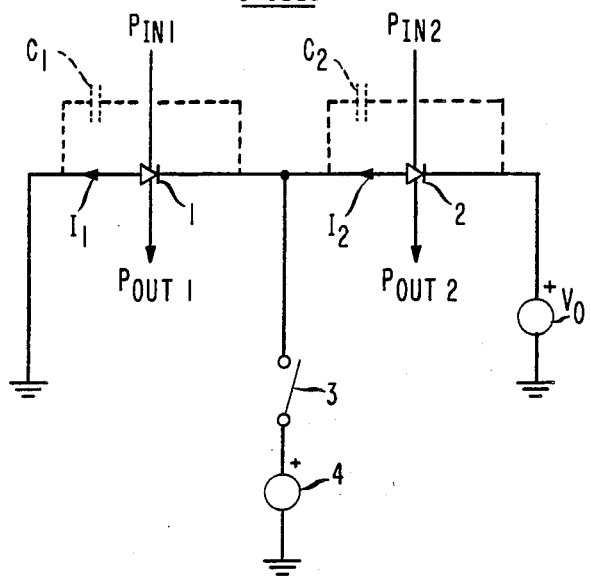
FIG. 1 is a schematic diagram of a symmetric self electro-optic effect device (S-SEED)

Conventional operation of the S-SEED is described in the above referenced U.S. Pat. No. 4,754,132. The self electro-optic effect is described in detail in an article by D. A. B. Miller et al., entitled "The Quantum Well Self Electro-Optic Effect Device; Optical Electronic Bistability and Oscillation, and Self-Linearized Modulation", IEEE Journal of Quantum Electronics, Vol. QE-21, September, 1985, pp. 1462–1476 and further described in an article by D. A. B. Miller et al., entitled "Integrated Quantum Well Self-Electro-Optic Effect Device; Array of Optically Bistable Switches", Applied Physics Letters, Vol. 49, September, 1986, pp. 821–823. Operation of a self-electro-optic effect device (SEED) is based on the quantum-confined Stark effect (QCSE), or other electrooptical absorptive mechanisms, in which changes in optical absorption (modulation) can be induced by electric fields in thin semiconductor layers (quantum wells). The absorption occurs at a predetermined wavelength, known as the exciton wavelength ($\lambda_0$). When the optical absorption is combined with a optical detection in a way to give positive optoelectronic feedback, optically bistability occurs. At least two SEEDs, having substantially similar electrical characteristics, combined in series forms a S-SEED. The series-coupled SEEDs act as electrical loads for each other and allow for complementary output optical signals $P_{OUT1}$, $P_{OUT2}$ as shown in FIG. 1. Here SEEDs 1,2 are series coupled and powered by a voltage source $V_0$. It is noted that $V_0$ refers to the voltage source $V_0$ as well as the potential supplied thereby. The two SEEDs 1,2 couple together at common node V. It is further noted that V refers to the node V as well as the voltage thereon. For purposes of this discussion, switch 3 and voltage source 4 are ignored and will be discussed below.

Figure 2:
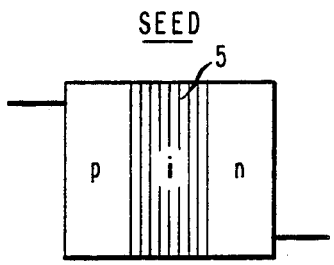
FIG. 2 is an exemplary self electro-optic device (SEED) physical structure.

Each SEED 1,2 can be thought of as a PIN photodetector combined with a QCSE modulator and a load, such as a resistor or another SEED. The load converts the photocurrent from the photodetector to a voltage which drives the QCSE modulator. This is illustrated in FIG. 2, where an exemplary SEED physical structure is shown without the load. The combination of the n, i, and p layers of the SEED forms a PIN photodetector. The multiple sub-layers 5, in the i layer, of alternating wide and narrow bandgap material (typically aluminum gallium arsenide and gallium arsenide, respectively) forms the QCSE modulator with the n and p layers as the contacts thereto. Hence, the PIN photodetector and QCSE modulator are disposed in parallel. This is described in more detail in the above-identified IEEE Journal of Quantum Electronics article. Alternatively, external photodetectors (not shown), such as photodiodes or phototransistors, can be placed in parallel with each SEED 1,2 (FIG. 1). The additional photodetectors can be responsive to the optical input signals or to other optical signals, such as a control signal.

Returning to FIG. 1, optical input beams $P_{IN1}$ and $P_{IN2}$ drive SEEDs 1 and 2, respectively, and comprise both optical bias beams and optical input signal beams, as will be described in more detail below. Optical output signal beams $P_{OUT1}$ and $P_{OUT2}$, outputs from corresponding SEEDs 1,2, are derived from the input beams $P_{IN1}$, $P_{IN2}$ after modulation by the SEEDs 1,2. It is noted that, for purposes here, $P_{IN1}$, $P_{IN2}$, $P_{OUT1}$, and $P_{OUT2}$ refers to the corresponding optical beams as well as the optical power thereof. Currents $I_1$ and $I_2$ correspond to the current flowing in corresponding SEEDs 1,2. During steady-state, the currents $I_1$ and $I_2$ are substantially the same. However, due to parasitic capacitance $C_1$ and $C_2$, when the S-SEED changes state, the two currents will not be equal, as will be explained below. It is also noted that the voltage $V_0$ can be zero volts as the SEEDs 1,2 can have photovoltaic properties.

Figure 3:
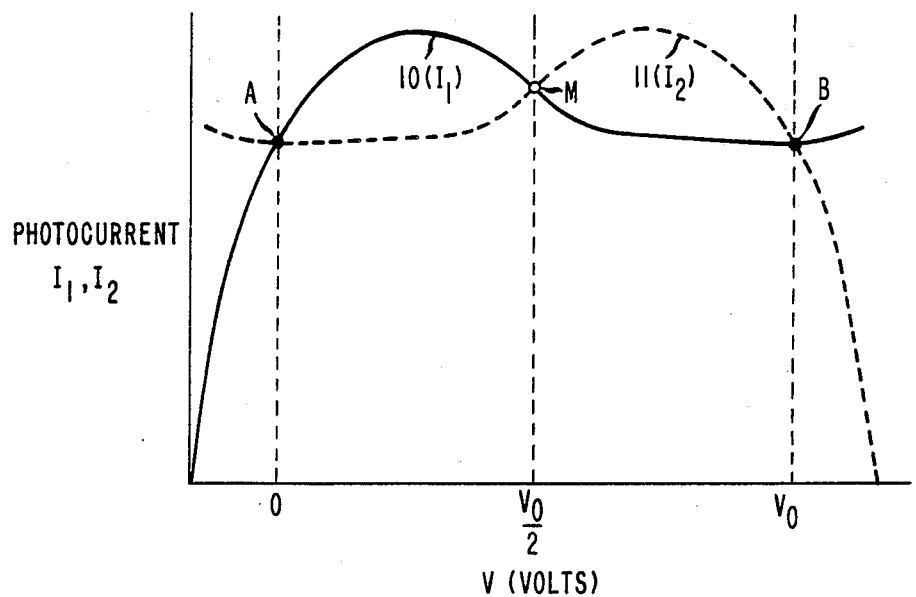
FIG. 3 are plots of the I-V characteristics of the S-SEED of FIG. 1 showing the stable and metastable points thereof; and, FIG. 4 is a plot of the I-V characteristic of the S-SEED with longwavelength optical bias beams applied.

Operation of the S-SEED is demonstrated in FIG. 3. Here, the currents $I_1$, $I_2$ (FIG. 1) are plotted against the voltage on node V of FIG. 1. When reading out the state of the S-SEED, substantially equal power optical bias beams $P_{IN1}$, $P_{IN2}$, having a wavelength of substantially $\lambda_0$, are applied to each SEED 1,2 (FIG. 1). This results in the curves 10 and 11, curve 10 corresponding to current $I_1$ and curve 11 corresponding to current $I_2$. It is noted that the curves 10, 11 have three intersections, A, B and M. Intersection points A and B are the points at which the S-SEED can operate in the steady-state ($I_1 = I_2$), demonstrating the bistable operation of the S-SEED. Point M indicates the metastable state between the stable states A, B at which the S-SEED is not very stable, i.e., the S-SEED cannot stay with the voltage on node V being $V_0/2$ for very long. Operation of the S-SEED, as known in the prior art, does not make use of the metastable state, point M. It is noted that the voltage on node V is substantially $V_0/2$ when the S-SEED is in the metastable state. However, it is understood that the voltage on node V may not be $V_0/2$ for the metastable state if the SEEDs 1,2 (FIG. 1) are not substantially the same electrically, i.e.,both SEEDs 1,2 have substantially the same I-V characteristics. Also, the parasitic capacitances $C_1$, $C_2$ will differ proportionally to the disparity in the sizes of the SEEDs 1,2. With the foregoing in mind, discussion of the exemplary embodiment of the invention will be limited to SEEDs 1, 2 being substantially identical.

Since the S-SEED is bistable, energy is required to switch if from one state to another. This is done by applying $P_{IN1}$, $P_{IN2}$, each being the optical bias beam and/or the optical input signal beam, to the SEEDs 1,2. Operation of the S-SEED, as known in the prior art, has optical bias beams applied prior to, and after, the application of the optical input signal beams, the optical input signal beams having switched the S-SEED. The optical bias beams correspond to that used to readout the S-SEED, discussed above. The optical input signal beams need not be at the exciton wavelength, $\lambda_0$. The optical power necessary for the S-SEED to switch from state A (FIG. 3) to state B (or vice-versa) is the difference between the optical power of beams $P_{IN0}$ and $P_{IN1}$. Since the power of the optical bias beams are substantially the same for both beams $P_{IN0}$ and $P_{IN1}$, the switching power comes from the optical input signal beams. The amount of optical energy needed is dependent on the capacitances $C_1$, $C_2$, the voltage of $V_0$, and the photo-electric conversion efficiency of the SEEDs 1,2. For the S-SEED as described in the above referenced U.S. Pat. No. 4,754,132, the optical switching energy is an exemplary six femtoJoules per square micrometer ($fJ/\mu m^2$) of device area with $V_0$ at approximately six volts. If, however, the S-SEED were to be placed at point M, the metastable point, prior to the application of the optical input signal beams, the switching energy required for the S-SEED, all else being substantially the same, drops to an exemplary one $fJ/\mu m^2$. To do so requires the selective application of a stimulus to the optically bistable device (S-SEED). Three exemplary stimuli, or techniques, of forcing the S-SEED to the metastable state M, are (1) reducing the bias voltage $V_0$ and then reestablishing $V_0$ to full voltage; (2) applying a predetermined voltage to node V (FIG. 1) or (3) applying substantially equal power long-wavelength optical bias beams to the SEEDs 1,2.

The first technique involves reducing the bias voltage $V_0$ with substantially equal power optical bias beams illuminating the SEEDs 1,2 (FIG. 1). The optical bias beams are then removed and the bias voltage $V_0$ is reestablished to full voltage. The resulting voltage on node V will be approximately $V_0/2$, the metastable point M (FIG. 3). The bias voltage $V_0$ is reduced to essentially zero volts, i.e., the two SEEDs 1,2 are placed in parallel, discharging the capacitances $C_1$, $C_2$ (FIG. 1) to have substantially equal voltages thereon. When $V_0$ is reestablished, the voltage on node V will then be substantially $V_0/2$. It is noted that, as discussed above, if the S-SEED is not symmetric, i.e., the SEEDs 1,2 are not substantially the same, the metastable state will be at a voltage deviating from $V_0/2$ proportional to the disparity in sizes of the SEEDs 1,2. Hence, it is advantageous that the SEEDs 1,2 are of substantially the same size so that the capacitance $C_1$, $C_2$ are substantially the same.

Returning to FIG. 1, the second technique uses a voltage source 4 selectively coupled to the node V via switch 3 to force the S-SEED into the metastable state when switch 3 is closed. It is noted that the voltage source 4 has a voltage substantially equal to the voltage on node V when the S-SEED is the metastable state. This voltage is shown in FIG. 3 as $V_0/2$ at the metastable state point M. As stated above, this voltage for the metastable state M is exemplary for substantially identical SEEDs 1,2 (FIG. 1) and can vary substantially from $V_0/2$ with different sizes of SEEDs 1,2. Optical input beams $P_{IN1}$, $P_{IN2}$ (optical bias beams together and/or the optical input signal beams) may be applied simultaneously with, or subsequent to, the closure of switch 3. Also, the optical bias beam may be applied prior to the application of the optical input signal beams. Switch 3 may be any conventional type of switch, such as a phototransistor (not shown).

Figure 4:
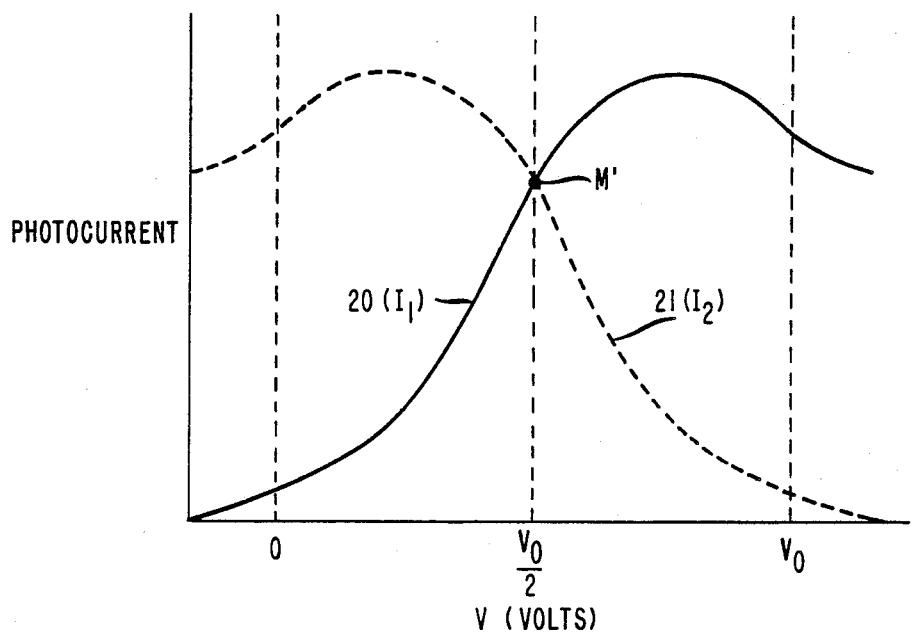

The third technique involves applying first substantially equal power optical bias beams with a wavelength substantially longer than $\lambda_0$ to the SEEDs 1,2 until the voltage on node V is substantially $V_0/2$. These optical bias beams, referred to as long-wavelength optical bias beams, are then removed. By using optical bias beams having wavelengths longer than the exciton wavelength, no bistability occurs in the S-SEED, as shown in FIG. 4. Here, curve 20 represents the current $I_1$ (FIG. 1) and corresponds to curve 10 (FIG. 3) while curve 21 represents the current $I_2$ (FIG. 1) and corresponds to curve 11 (FIG. 3). As shown, there is only one point, M', at which the photocurrents $I_1$, $I_2$ (FIG. 1) of SEEDs 1,2 intersect. This point becomes the stable point of the S-SEED until the long wavelength optical bias beams are removed and the S-SEED functions as shown in FIG. 3. After the removal of the long wavelength optical bias beams, the S-SEED is in the metastable state (point M of FIG. 3) when the bias beams of wavelength $\lambda_0$ are applied. Then the optical input signal ($P_{IN1}$, $P_{IN2}$) may be applied. To reduce the time necessary for the S-SEED to switch, the optical bias beam and the input signal beams may be applied substantially simultaneously or the input signal beams may be applied before the bias beams.

It is also understood that the optically bistable device (S-SEED) may be selectively placed in the metastable state. By applying an optical input signal having insufficient energy to switch the S-SEED if it is not in the metastable state, (i.e., the energy of the optical input signal is sufficient to switch the S-SEED only when the S-SEED is in the metastable state) the S-SEED may be selectively switched, or gated. Any of the aforementioned techniques to force the S-SEED into metastability may be used selectively. This allows for multiple S-SEEDs to be selectively responsive to a common optical input signal, such as in a demultiplexer. For example, using the exemplary S-SEED described above and in the aforementioned U.S. Pat. No. 4,754,132, if an optical input signal, having an exemplary energy density of two fJ/$\mu$m$^2$, was applied to the S-SEED, then the S-SEED would switch if it had been placed in the metastable state prior to the incidence of the optical input signal. Conversely, the exemplary S-SEED would not switch if it had not first been placed in the metastable state.

Having described the preferred embodiment of this invention, it will now be apparent to one of skill in the art that other embodiments incorporating its concept may be used. It is felt, therefore, that this invention should not be limited to the disclosed embodiment, but rather should be limited only by the spirit and scope of the appended claims.

We claim:

1. A method for increasing the processing capacity of an optical digital processing system, the optical digital processing system having at least one optically bistable device responsive to an optical input signal and having a metastable state between two stable states, characterized by the steps of:
    applying a stimulus to force the optically bistable device into the metastable state;
    applying the optical input signal to the device; and,
    removing the stimulus.

2. The method for increasing the processing capacity of an optical digital processing system as recited in claim 1, the optically bistable device being powered by a bias voltage of $V_0$, wherein the step of applying a stimulus is characterized by:
    applying substantially equal intensity optical bias beams to the optically bistable device; and,
    reducing the bias voltage source to the optically bistable device to substantially zero volts until the device substantially reaches a metastable state.

3. The method for increasing the processing capacity of an optical digital processing system as recited in claim 2,
    wherein the step of removing the stimulus is characterized by:
    reestablishing the bias voltage to be substantially $V_0$.

4. The method for increasing the processing capacity of an optical digital processing system as recited in claim 3,
    wherein the optically bistable device has at least two photodetectors in series; and,
    wherein the metastability is indicated by substantially equal voltage across each of the photodetectors.

5. The method for increasing the processing capacity of an optical digital processing system as recited in claim 4, wherein the optically bistable device is a symmetric self electro-optic effect device (S-SEED).

6. The method for increasing the processing capacity of an optical digital processing system as recited in claim 1, the optically bistable device has at least two self electro-optic effect devices (SEEDs) in series and has a predetermined exciton wavelength ($\lambda_0$), the step of applying a stimulus is characterized by the step of:
    applying substantially equal intensity first optical bias beams at a wavelength longer than $\lambda_0$ until the voltage across each of the SEEDs is substantially the same.

7. The method for increasing the processing capacity of an optical digital processing system as recited in claim 6, the steps of applying the optical input signal and removing the stimulus is characterized by the steps of:

removing the first optical bias beams;
applying substantially equal intensity second optical bias beams to the SEEDs at a wavelength substantially equal to $\lambda_0$; and,
applying the optical input signals to the SEEDs.

8. The method for increasing the processing capacity of an optical digital processing system as recited in claim 7, wherein the steps of applying the second optical bias beams and the optical input signals occur substantially at the same time.

9. The method for increasing the processing capacity of an optical digital processing system as recited in claim 1, wherein the optically bistable device has at least two series coupled photodetectors with at least one common node, and wherein the step of applying a stimulus is characterized by the step of:
coupling a predetermined voltage to the common node.

10. The method for increasing the processing capacity of an optical digital processing system as recited in claim 9, wherein the steps of applying an optical input signal and removing the stimulus is characterized by the steps of:
applying optical bias beams to the photodetectors;
applying the optical input signals to the photodetectors; and,
decoupling the predetermined voltage from the common node.

11. The method for increasing the processing capacity of an optical digital processing system as recited in claim 10, wherein the steps of applying the optical bias beams and the optical input signals occur substantially at the same time.

12. The method for increasing the processing capacity of an optical digital processing system as recited in claim 10, wherein the optically bistable device is a symmetric self electro-optic effect devices (S-SEED) and is powered by a voltage source having a voltage of $V_0$ and the predetermined voltage is substantially $V_0/2$.

13. An optical digital processing system having at least one optically bistable device responsive to an optical input signal and having a metastable state between two stable states, the optically bistable device having at least two photodetectors in series joined at a common node, characterized by:
a voltage source having a predetermined voltage; and,
a switch means for selectively coupling the voltage source to the common node;
wherein the predetermined voltage, when coupled to the common mode, places the device in substantially the metastable state.

14. The optical digital processing system as recited in claim 13, wherein the optically bistable device is powered by a bias voltage of $V_0$ and the predetermined voltage is substantially $V_0/2$.

15. The optical digital processing system as recited in claim 14, wherein the optically bistable device is a symmetric self electro-optic effect device 16. A method for selectively switching at least one optically bistable device in an optical digital processing system, the optically bistable device being responsive to an optical input signal and having a metastable state between two stable states, characterized by the steps of:
selectively applying a stimulus to force the optically bistable device into the metastable state;
applying the optical input signal to the device; and,
removing the stimulus; wherein the energy supplied to the optically bistable device by the optical input signal is sufficient to switch the optically bistable device only if the stimulus is applied.

17. The method for selectively switching at least one optically bistable device in an optical digital processing system as recited in claim 16, the optically bistable device being powered by a bias voltage of $V_0$, wherein the step of selectively applying a stimulus is characterized by:
selectively applying substantially equal intensity optical bias beams to the optically bistable device; and,
reducing the voltage of the bias voltage source to the optically bistable device to substantially zero volts until the device substantially reaches a metastable state.

18. The method for selectively switching at least one optically bistable device in an optical digital processing system as recited in claim 17,
wherein the step of removing the stimulus is characterized by:
reestablishing the bias voltage to be substantially $V_0$.

19. The method for selectively switching at least one optically bistable device in an optical digital processing system as recited in claim 16, the optically bistable device has at least two self electro-optic effect devices (SEEDs) in series and has a predetermined exciton wavelength ($\lambda_0$), the step of selectively applying a stimulus is characterized by the step of:
selectively applying substantially equal intensity first optical bias beams at a wavelength longer than $\lambda_0$ until the voltage across each of the SEEDs is substantially the same.

20. The method for selectively switching at least one optically bistable device in an optical digital processing system as recited in claim 19, the steps of applying the optical input signal and removing the stimulus is characterized by the steps of:
removing the first optical bias beams;
applying substantially equal intensity second optical bias beams to the SEEDs at a wavelength substantially equal to $\lambda_0$; and,
applying the optical input signals to the SEEDs.

21. The method for selectively switching at least one optically bistable device in an optical digital processing system as recited in claim 16, wherein the optically bistable device has at least two series coupled photodetectors with at least one common node, and wherein the step of selectively applying a stimulus is characterized by the step of:
selectively coupling a predetermined voltage to the common node.

22. The method for selectively switching at least one optically bistable device in an optical digital processing system as recited in claim 21, wherein the steps of applying an optical input signal and removing the stimulus is characterized by the steps of:
applying optical bias beams to the photodetectors;
applying the optical input signals to the photodetectors; and
decoupling the predetermined voltage from the common node.

23. The method for selectively switching at least one optically bistable device in an optical digital processing system as recited in claim 22, wherein the optically bistable device is symmetric self electro-optic effect devices (S-SEED) and is powered by a voltage source having a voltage of $V_0$ and the predetermined voltage is substantially $V_0/2$.

* * * * *